US012608156B2

(12) United States Patent
El-Batal et al.

(10) Patent No.: US 12,608,156 B2
(45) Date of Patent: Apr. 21, 2026

(54) HARD DISK DRIVE DIRECT METADATA AND DATA CACHING TO HOST MEMORY BUFFER VIA NONVOLATILE MEMORY EXPRESS

(71) Applicant: SEAGATE TECHNOLOGY LLC, Fremont, CA (US)

(72) Inventors: Mohamad El-Batal, Superior, CO (US); Jon D. Trantham, Chanhassen, MN (US); Nicholas James Dance, Boulder, CO (US); Kristofer Carlson Conklin, Minneapolis, MN (US); Thomas Roy Prohofsky, Edina, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/773,145

(22) Filed: Jul. 15, 2024

(65) Prior Publication Data

US 2026/0016983 A1    Jan. 15, 2026

(51) Int. Cl.
G06F 3/06 (2006.01)

(52) U.S. Cl.
CPC .......... G06F 3/0656 (2013.01); G06F 3/0604 (2013.01); G06F 3/0676 (2013.01)

(58) Field of Classification Search
CPC ........................................................ G06F 3/06
See application file for complete search history.

(56) References Cited

U.S. PATENT DOCUMENTS

| | | | | |
|---|---|---|---|---|
| 2010/0086134 A1* | 4/2010 | Ureche | .................. | G06F 21/80 |
| | | | | 380/277 |
| 2018/0239696 A1* | 8/2018 | Lim | ...................... | G06F 3/0625 |
| 2019/0042460 A1 | 2/2019 | Trika | | |
| 2019/0250845 A1* | 8/2019 | Kabra | ................. | G06F 13/1673 |
| 2020/0012595 A1* | 1/2020 | Bordia | ................. | G06F 3/0673 |
| 2021/0096778 A1 | 4/2021 | Nagarajan | | |
| 2023/0153028 A1* | 5/2023 | Hahn | .................... | G06F 3/0679 |
| 2024/0045751 A1* | 2/2024 | Sie | ......................... | G06F 11/325 |
| 2025/0068569 A1* | 2/2025 | Chen | ................... | G06F 12/1072 |

OTHER PUBLICATIONS

"Reimagining Memory and Storage in the Data Center" Brochure, Intel Corporation, 2018; 6 pages.
"Multi-Tier Caching Technology" Brochure, Seagate, Fremont, California, 2017; 5 pages.
"Enhanced Caching Advantage—TurboBoost and Advanced Write Caching", Brochure, Seagate, Fremont, California, 2016, 5 pages.
"Reimagining HDDs with OptiNAND Technology" Brochure, Western Digital, San Jose, California, 2022, 6 pages.
Smith, "What Are Host Memory Buffer or HMB NVMe SSDs" ServeHome, Aug. 1, 2022, 5 pages.
Lin, "NAND Flash 101: Host Memory Buffer What Is HMB and How Does It Work?" NAND Flash 101, Technology, Nov. 15, 2021, 10 pages.

* cited by examiner

*Primary Examiner* — Khoa D Doan
(74) *Attorney, Agent, or Firm* — Mueting Raasch Group

(57) ABSTRACT

Described are data processing and storage systems, and methods for use therewith, that make use of a host memory buffer (HMB) partition of one or more host devices to directly cache at-risk data from one or more HMB-aware hard disk drives (HDDs) via remote direct memory access over nonvolatile memory express interfaces and protocols.

12 Claims, 4 Drawing Sheets

HARD DISK DRIVE DIRECT METADATA AND DATA CACHING TO HOST MEMORY BUFFER VIA NONVOLATILE MEMORY EXPRESS

TECHNICAL FIELD

The disclosure relates to hard disk drive caching to one or more host devices.

SUMMARY

In accordance with various aspects, the present disclosure describes data processing and storage systems that includes a host device connected to one or more hard disk drives (HDDs), for example through nonvolatile memory express interfaces and protocols. The host device includes a host memory buffer (HMB) that is power loss protected. The HDD includes a controller, rotating data storage media, and a memory buffer. The HMB is addressable for writing from the memory buffer of the HDD via remote direct memory access, and the hard disk drive is configured to cache at-risk data directly to the HMB.

In certain aspects, the HDD may be configured so that at-risk data is not cached to the rotating data storage media. In certain aspects, the HDD may be configured so that at-risk data is not cached to a non-volatile memory included in the hard disk drive. In certain aspects, the HDD may be configured to cache at-risk data to the host memory buffer opportunistically, whenever at-risk data is available for caching, upon detecting a power loss condition, or on combinations of these.

In certain aspects, the at-risk data may include hard disk drive write data, un-journaled hard disk drive indexing tables, and/or hard disk drive track/head calibration data.

In certain aspects, data stored on the rotating magnetic media of the HDD is unreadable when the hard disk drive is decoupled from the host device.

In certain aspects, the host device may be a data center server or client. In certain aspects, the HDD may be connected to additional host devices, such as through a dual port PCIe interface or an NVMe over fabric network interface.

In certain aspects, the host device may be configured to maintain a duplicate copy of data in the host memory buffer.

In various aspects the present disclosure provides an HMB-aware NVMe HDD configured to directly cache data to a host memory buffer (HMB) of a host device connected to the HDD via an NVMe interface.

The present disclosure further provides methods for use with such an HMB-aware NVMe HDD. Such methods may include connecting the HMB-aware NVMe HDD to a host device through an NVMe interface, the host device including an HMB partition. An initial transfer may be performed whereby manufacturing metadata stored on the HMB-aware NVMe HDD is transferred to the HMB partition. After the initial transfer of manufacturing metadata, the methods may include caching updated metadata from the HMB-aware NVMe HDD to the HMB partition via remote direct memory access. In certain aspects, methods may include accessing by the HMB-aware NVMe HDD metadata stored in the HMB partition during runtime, reboot, or spin-up operations of the HMB-aware NVMe HDD.

In certain aspects, caching of updated metadata may be performed on an opportunistic basis or on detection of a power loss event.

In certain aspects, the HMB-aware NVMe HDD may be connected to additional host and/or peer devices, for example through a dual port PCIe interface or using an NVMe over fabric layer. When connected to multiple devices, the methods may include determining where to cache updated metadata (that is, to which host or peer device) based on one or more of available bandwidth, latency, host activity, and logical block address range of the data to which the metadata refers.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
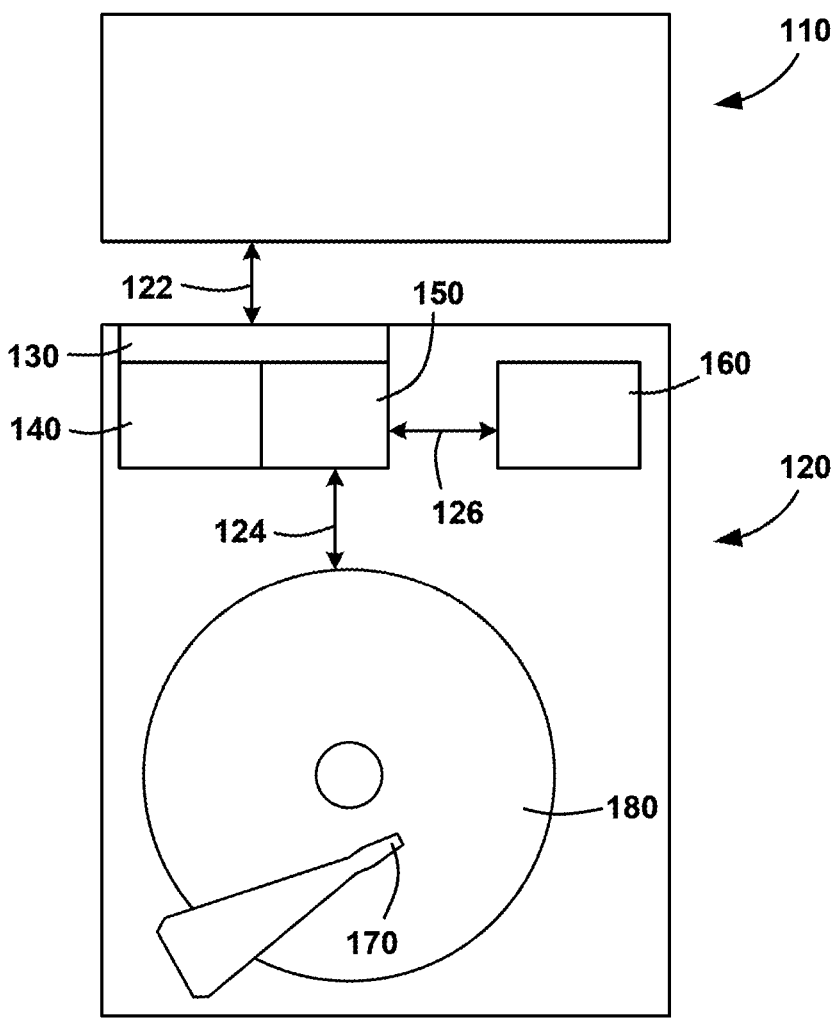
FIG. 1 is a schematic depiction of a prior art storage system including a hard disk drive in communication with a host device.

The present disclosure relates to storage systems in which hard disk drives (HDDs) are connected to host devices, such as data center servers. In particular, the present disclosure relates to storage systems in which an HDD is communicatively coupled to a host device so that the HDD can directly store its metadata tables and write-back cache to a host memory buffer (HMB) partition. This can be accomplished by connecting the HDD to the host through an NVMe (non-volatile memory express) interface. By caching data from the HDD directly to the HMB (and instead of on the HDD), the need for designating space on the rotating media of the HDD for caching (media cache) or for providing non-volatile flash or other non-volatile memory within the HDD can be greatly reduced or even eliminated, thus freeing up much needed capacity and reducing cost and complexity within the drive.

Moreover, because host systems such as data centers have battery back-up or other power loss provisions, and because fast data transfers can occur directly between the HDD memory and the HMB through remote direct memory access (RDMA) protocols, configuring the HDD to use the host for caching and journaling can greatly reduce either or both of the amount of data that the HDD must account for in case of power loss as well as the power required to do so. Storing HDD logs and journal entries in the HMB can also provide fast spin-up or reboot times because journal and log information can be loaded directly from the HMB rather than needing to be retrieved from the disk media cache. Should a drive malfunction or fail, the journal and logs can be retrieved from the HMB for failure analysis. Overall, HDD direct caching to the HMB can enhance HDD performance, reduce HDD power, provide faster HDD power-up, improve debuggability, and remove the need for cost-prohibitive non-volatile memory such as NOR and/or NAND flash in the HDD.

Current HDDs are required to protect and vault all write data held in a non-volatile cache (NVC), as well as to protect all un-journaled drive indexing tables and track/head calibration data against a power loss condition. This can result in the NVC capacity available for write data being less than optimal for write intensive applications. Furthermore, much of the critical track indexing information tables and head calibration metadata in current HDDs are stored and journaled from DRAM onto NOR flash and rotational media, which can lead to slower spin-up times as well as lower HDD performance due to the need to access the rotational media for table lookups. As for power loss conditions, the process in current HDDs for data-vaulting the critical data residing in volatile DRAM involves converting kinetic rotational energy from the spinning media disk platters into electrical power to thereby transfer the DRAM data onto expensive and power-consuming non-volatile memories, such as NOR, sNAND, iNAND, MRAM, ferroelectric, phase-change, and so forth.

Datacenters provide battery backup for all servers/clients within the rack, and thus their memory can be considered non-volatile and resilient. In certain cases, the servers employ NVDIMMs for double protection. In accordance with various aspects of the present disclosure, the HDD can directly cache data to the HMB of the host device to thereby protect and vault data such as the NVC write data (that is, any host/user data or related metadata that is held in volatile memory and has not yet been written to non-volatile media) and the track/head indexing/calibration data. Such data can be continuously or opportunistically written and journaled from the HDD into the HMB partition, which is typically carved by the NVMe driver at start of day from the host CPU/DPU battery backed memory. Upon a power loss event, the final journaling update can be transferred via RDMA very quickly such that the stored rotational energy from the HDD should be well more than sufficient to complete. Alternatively, NVC write data and track/head indexing/calibration data can be kept in local HDD DRAM and then data-vaulted into the HMB partition using RDMA upon power loss. This process may be controlled by the HDD firmware, and may be accomplished at much higher speeds than vaulting into NOR or sNAND/iNAND flash. In either use case, the expense and power consumption of NOR or sNAND/iNAND flash devices may be removed from the HDD.

It is further recognized in the present disclosure that direct caching of NVM write data, journals, and indexes from the HDD onto the HMB partition creates a situation where the HDD is securely unreadable if it is removed from the host. As such, direct HDD caching onto the HMB in effect produces a securely erased drive by simply separating the drive from the host.

In certain embodiments, an HMB-aware HDD may be connected to multiple host devices and/or peer devices, for example through an interface that includes dual PCIe ports to connect the HDD to two host devices and/or by utilizing NVMe over fabric to connect the HDD to multiple other devices such as host devices, peer storage devices, and so forth.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 schematically depicts typical known storage system in which a host device 110 communicates with an HDD 120, for example through a SAS or SATA interface. HDD 120 includes a SAS or SATA interface connector 130 through which information 122 can be sent to and received from the host device 110. Information 122 may be in the form of read and write requests from the host 110, data from the host 110 to be stored on HDD 120, and stored data retrieved from HDD 120. The HDD includes a controller 140 for controlling the operation of various components of the HDD such as recording head 170 and magnetic media storage disk 180, as well as to govern the movement of data within as well as in and out of the HDD. The HDD includes a data buffer 150, which is typically DRAM or another form of volatile memory. The data buffer 150 can be used to stage data that is being written onto media 180 using recording head 170, to store write data until proper writing onto media 180 can be verified, to receive read data that is being prepared to send to the host device 110, and to keep metadata related to the data reading and writing events taking place. As for data that needs to be protected from data loss events or otherwise data-vaulted, such data can be stored from the data buffer 150 to a zone of the media disk 180 that is designated for media cache, as indicated by arrow 124, or in the case that a non-volatile memory 160 is provided, such as NOR flash, NAND flash, and so forth, such data can be stored from the data buffer 150 to the non-volatile memory 160, as indicated by arrow 126.

In contrast to what known configurations can currently provide, aspects of the present disclosure provide for data processing and storage systems in which the host hardware and drivers support a byte-addressable and/or RDMA-addressable HMB partition configuration, and in which HDDs are connected to the host through NVMe such that the at-risk data is directly cached from the HDD to the HMB. In certain aspects, the HMB content of every NVMe-connected HDD is continuously preserved by the host, with duplicate copies potentially being replicated and preserved by the host software across the cluster. Alternatively, at-risk data can be kept in local HDD DRAM, and then upon a power loss event the drive firmware can data-vault the DRAM content using RDMA into the HMB partition of the host.

Figure 2:
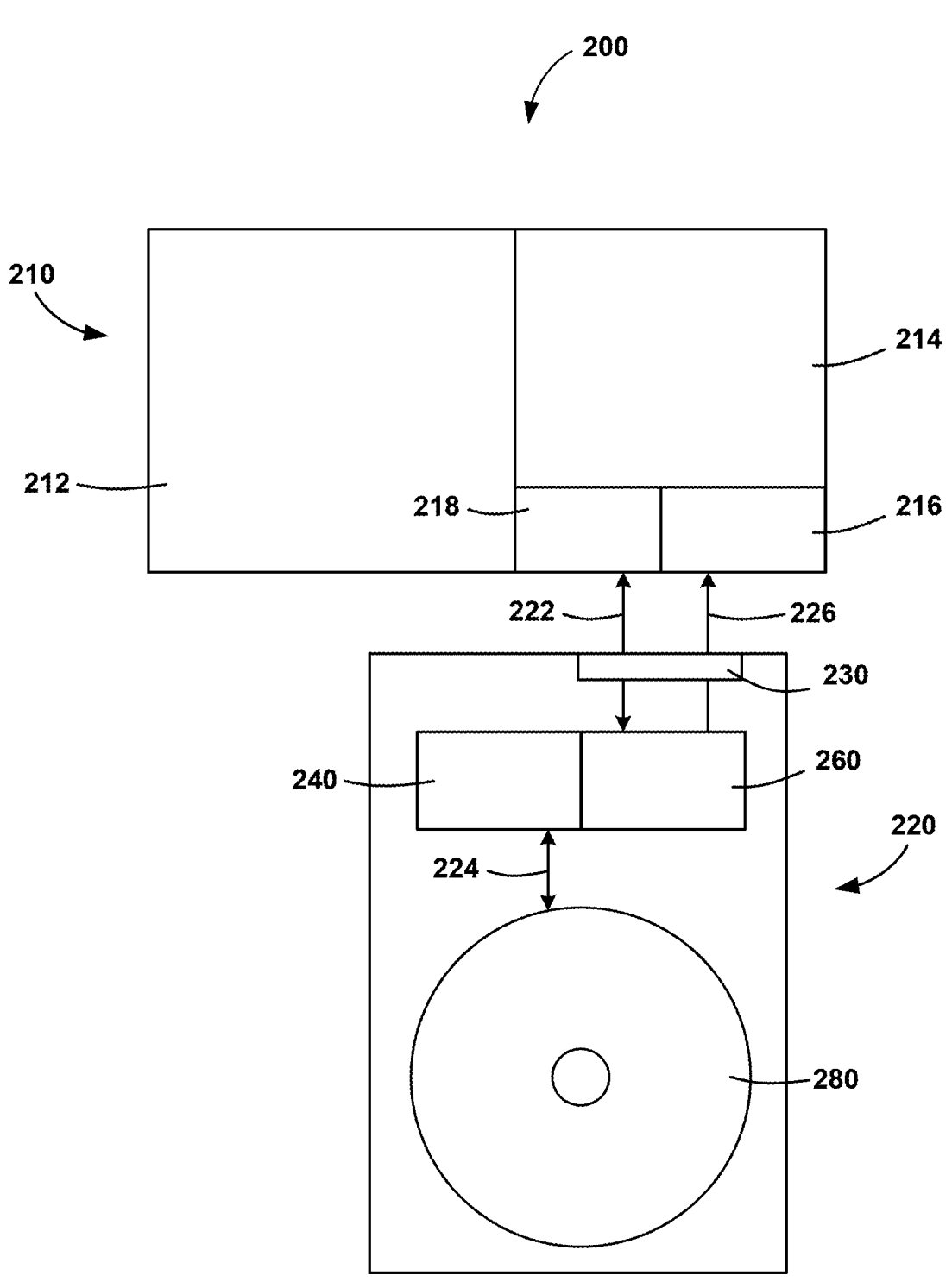
FIG. 2 is a schematic depiction of a data processing and storage system including an HMB-aware HDD in accordance with various aspects of the present disclosure.

FIG. 2 schematically illustrates a system 200 in accordance with various aspects of the present disclosure. Host 210 and HDD 220 are communicatively coupled through an NVMe interface and protocol such that the HDD is considered to be HMB-aware. Currently, the NVMe interface is the only interface that would allow RDMA transfers of data for caching directly from the HDD memory buffer to the HMB partition of the host and for the HDD to be considered HMB-aware. The various aspects of the present disclosure are equally applicable to any later-developed interfaces and protocols that allow for direct caching of HDD at-risk data to the HMB and for the HDD to be considered HMB-aware. As such, it will be understood that "NVMe" or "NVMe interface" includes any and all interfaces that allow for direct caching of HDD at-risk data to the HMB.

The host 210 can be any client, server, computer, node, and so forth, and generally includes a processor 212 (CPU/DPU), a DRAM portion 214, an NVMe driver 218, and an HMB partition 216, which is typically carved out of the DRAM portion 214. The NVMe-aware HDD 220 includes an NVMe interface 230, a controller 240, DRAM or other volatile memory buffer 260, and magnetic recording media 280. The controller 240 controls the ingress and egress of data 224 to and from the magnetic recording media 280, typically providing in the form of spinning disks. The DRAM 260 stores staged write or read data during execution of commands as well as metadata important for the operation of the HDD 220. Because the data on DRAM 260 is at-risk, it is data-vaulted 226 via RDMA (also referred to as direct caching throughout the present disclosure) to the HMB partition 216. Host commands for data to be stored to or to be retrieved from the HDD 220 are communicated between NVMe interface 230 of the HDD 220 and NVMe driver 218 of the host 210, as indicated by arrow 222.

Figure 3:
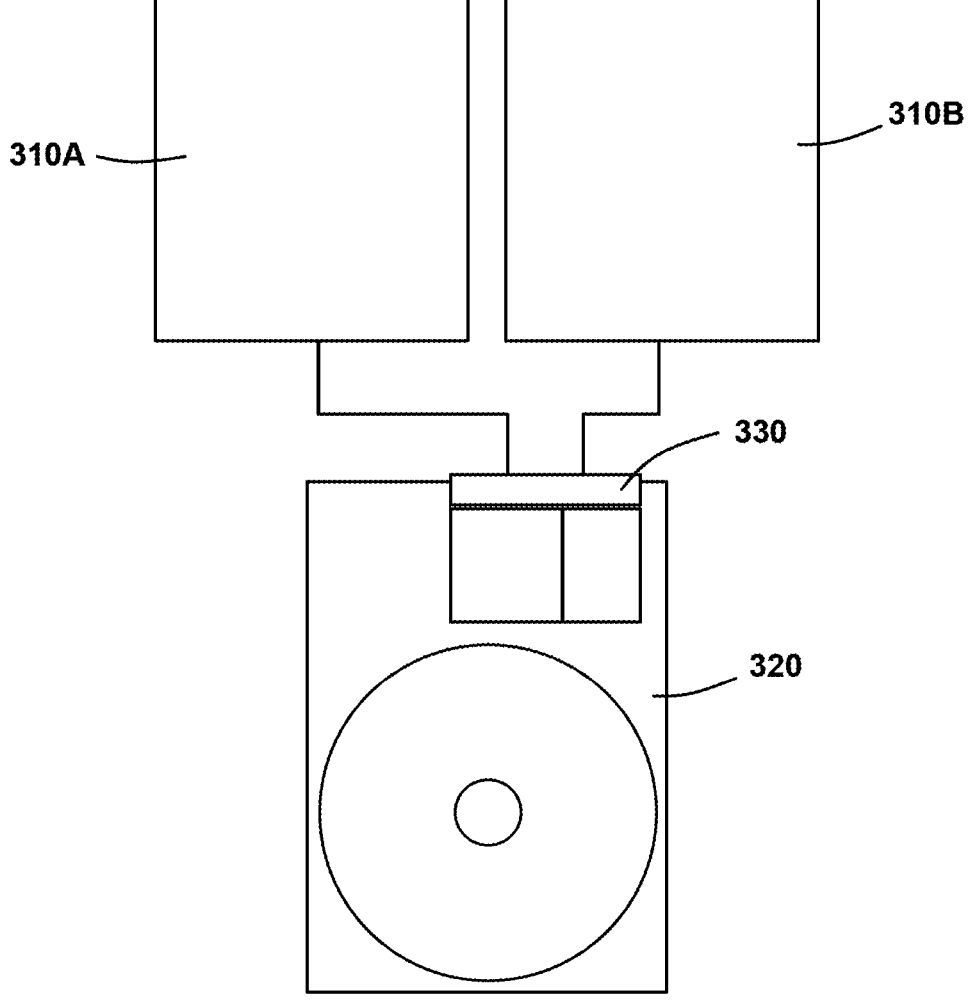
FIG. 3 is schematic depiction of a data processing and storage system including an HMB-aware HDD coupled to multiple host devices in accordance with certain aspects of the present disclosure.

In certain processing and storage systems in accordance with the present invention, a single HDD or multiple HDDs can be connected to one host device. In other embodiments, a single HDD may be connected to multiple host devices. For example, an HDD may be equipped with dual PCIe interfaces, or a network interface may be added that provides an NVMe over fabric layer between the drive and hosts. FIG. 3 schematically shows an example of an HMB-aware HDD 320 that is connected to two host devices 310A and 310B. The drive interface 330 may provide dual PCIe interfaces so that the HDD 320 can communicate independently with each of the host devices 310A and 310B. The drive interface 330 may connect to an NVMe over fabric layer (not separately indicated) that in turn connects to each of the host devices 310A and 310B.

When connected to multiple hosts each having an associated HMB partition, the HMB-aware HDD can be configured to spread data across the HMB partitions of the hosts based on various factors such as bandwidth, latency, host activity, logical block address (LBA) range of the data, or combinations of these. HMB replication can then be performed on these bases as well, with server fault tolerance being based on performance of HMB replication.

Moreover, when an NVMe over fabric layer is used, certain non-volatile NVMe devices, such as an SSD, may be utilized as peer devices to the HDD. In such configurations, the HDD could send journal writes to the NVMe peer. As such, the present disclosure includes peer devices in NVMe over fabric configurations as possible buffer locations in addition to or instead of HMB partitions of host devices.

Figure 4:
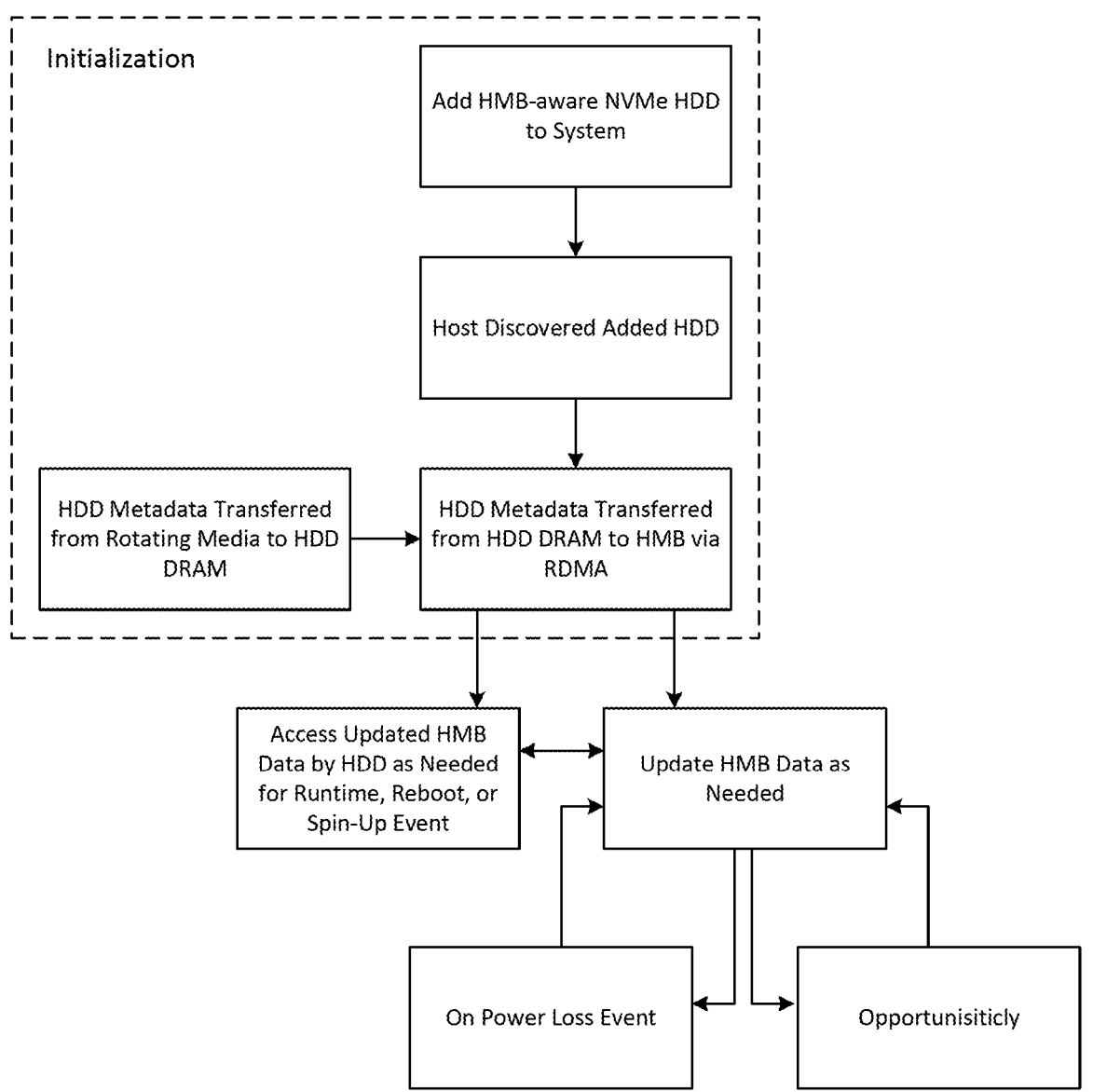
FIG. 4 is a flow chart schematically showing steps involved in the initialization and operation of an HMB-aware HDD in accordance with certain aspects of the present disclosure.

FIG. 4 shows a flow chart representing steps the initialization and operation of an HMB-aware NVMe HDD in a system such as shown in FIG. 2. When the HMB-aware NVMe HDD is first added to the system and discovered by the host, all the manufacturing metadata tables of the HDD that contain the rotational media formatting and read/write head calibration information are copied from the reserved rotational media space (the media cache) into the HDD DRAM, and then from there the metadata is all transferred via RDMA to the host-protected HMB space. At this point, the ability for the HDD to directly cache data to the HMB has been initialized such that, going forward, the HDD no longer needs to access reserved metadata tables from the rotational media (or another other non-volatile media within the HDD) during input/output (IO) servicing runtime operations, or during any subsequent reboot or spin-up operations. Instead, from this point on, the drive can now rely on the presence of the latest copy of these metadata tables on the HMB space to access during runtime, reboot, spin-up operations.

During normal drive operations, the HDD metadata information may be paged in and out from the HMB space to the HDD DRAM on an as-needed chunk-size basis to support the normal HDD metadata checks and updates. Any changes or updates to the HDD metadata tables that are made by the HDD may occur based on two approaches. One approach is to occasionally and opportunistically journal the metadata to the HMB via small RDMA bursts during normal operations, which acts to reduce the amount of data that would need to be flushed to the HMB during a power loss condition. Another approach is to wait until a power loss condition has occurred and then flush the full list of updates of the metadata to the host-protected HMB all at once. A combination of the two approaches can also be used.

During normal drive operations (that is, power-present conditions), the write and read IO commands from the host are processed normally by the HDD, and as such the HMB may not receive any immediate traffic directly related to these normal transactions. The write IOs may be serviced from DRAM write-back cache, and then may be flushed to rotational media storage on an opportunistic basis in the background using write speed optimized large sequential media writes operations. The read IOs may be serviced from DRAM on read-cache-hits or from rotational media on read-cache-misses. Within an HMB-aware NVMe HDD write-back cache usage model, the full content of the HDD write-back cache can be transferred from the HDD DRAM to the host-protected HMB memory space in a single cache flush operation upon a power loss event or condition. The potential energy from the rotational motion of the media platters is converted and used to maintain power to a portion of the HDD controller and DRAM while they perform the host protected HMB RDMA flush operation of the full write-back cache along with necessary metadata table updates (whether full update list or journaled chucks).

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," and so forth, means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A data processing and storage system comprising:
a host device including a host memory buffer that is power loss protected; and
a hard disk drive including a controller, rotating data storage media, and a memory buffer,
wherein the hard disk drive is communicatively coupled to the host device through a nonvolatile memory express interface such that the host memory buffer is addressable for writing by the memory buffer of the hard disk drive via remote direct memory access, wherein the hard disk drive is configured to cache at-risk data directly to the host memory buffer, and
wherein the hard disk drive is further configured to cache at-risk data to the host memory buffer upon detecting a power loss condition.

2. The data processing and storage system of claim 1, wherein the hard disk drive is configured so that at-risk data is not cached to the rotating data storage media.

3. The data processing and storage system of claim 1, wherein the hard disk drive is configured so that at-risk data is not cached to a non-volatile memory included in the hard disk drive.

4. The data processing and storage system of claim 1, wherein the hard disk drive is configured to cache at-risk data to the host memory buffer whenever at-risk data is available for caching.

5. The data processing and storage system of claim 1, wherein the hard disk drive is configured to cache at-risk data to the host memory buffer on an opportunistic basis.

6. The data processing and storage system of claim 1, wherein data stored on the rotating magnetic media is unreadable when the hard disk drive is decoupled from the host device.

7. The data processing and storage system of claim 1, wherein the host device is a data center server or client.

8. The data processing and storage system of claim 1, wherein the host device is configured to maintain a duplicate copy of data in the host memory buffer.

9. The data processing and storage system of claim 1, wherein the at-risk data comprises hard disk drive write data, un-journaled hard disk drive indexing tables, and/or hard disk drive track/head calibration data.

10. An HMB-aware NVMe HDD configured to directly cache at-risk data to a host memory buffer (HMB) of a host device connected to the HDD via an NVMe interface upon detecting a power loss condition.

11. The HMB-aware NVMe HDD of claim 10, comprising dual PCIe ports so that the HMB-aware NVMe HDD is connectable to two separate host devices.

12. A data processing and storage system comprising:
a host device including a host memory buffer that is power loss protected; and
a hard disk drive including a controller, rotating data storage media, and a memory buffer,
wherein the hard disk drive is communicatively coupled to the host device through a nonvolatile memory express interface such that the host memory buffer is addressable for writing by the memory buffer of the hard disk drive via remote direct memory access,
wherein the hard disk drive is configured to cache at-risk data directly to the host memory buffer, and
wherein the hard disk drive is configured so that at-risk data is not cached to the rotating data storage media and so that at-risk data is not cached to the non-volatile memory included in the hard disk drive.

* * * * *